Feb. 3, 1925.
L. W. WYMAN
WATER GATE
Filed Aug. 8, 1923
1,525,216
2 Sheets-Sheet 1
Fig.1.
Fig.2.
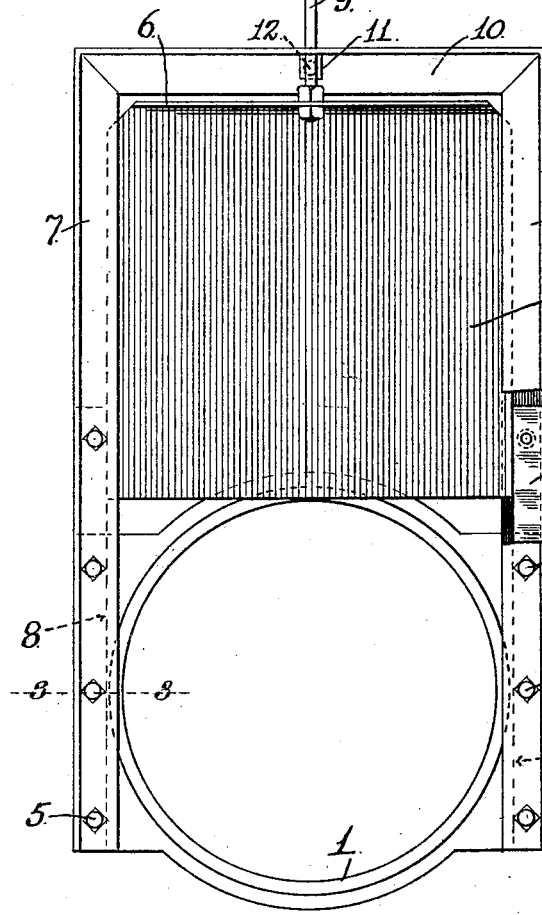
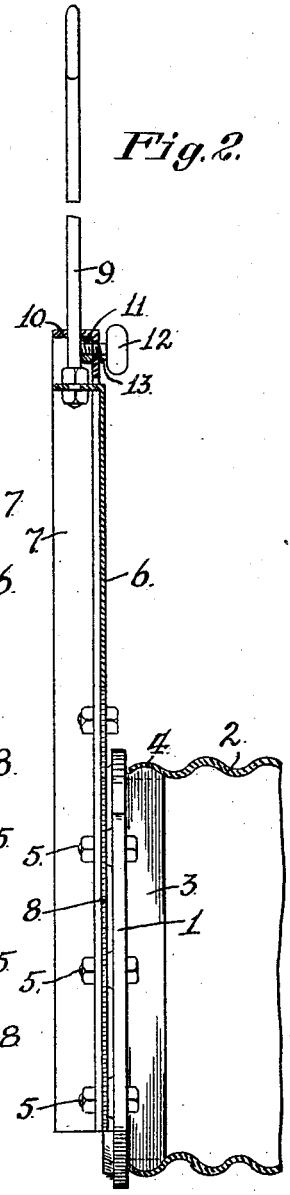
INVENTOR.
Laurence West Wyman
BY Book & Booth
ATTORNEYS.

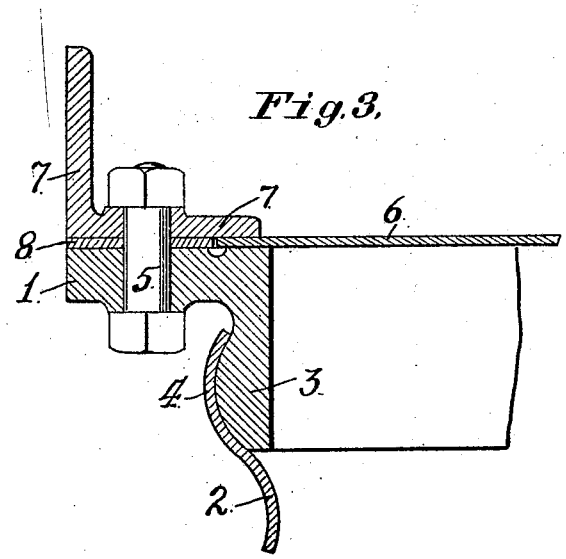

Patented Feb. 3, 1925.

1,525,216

UNITED STATES PATENT OFFICE.

LAURENCE WEST WYMAN, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

WATER GATE.

Application filed August 8, 1923. Serial No. 656,432.

*To all whom it may concern:*

Be it known that I, LAURENCE WEST WYMAN, a citizen of the United States, residing at Oakland, in the county of Alameda and State of California, have invented certain new and useful Improvements in Water Gates, of which the following is a specification.

My invention relates to the class of water gates and has for its object the provision of a gate which will be economical to manufacture and easy to install, especially and particularly with respect to the means for locking it in different positions.

With this object in view my invention consists in the novel water gate which I shall now fully describe, by reference to the accompanying drawings in which—

Fig. 1 is a front view broken in part of my gate, showing it in open position.

Fig. 2 is a side view of the same, partly in section.

Fig. 3 is a cross section enlarged, on line 3—3 of Fig. 1.

1 is a gate-seating member which may be attached to a conduit 2 in any suitable manner.

In the drawings, Figs. 2 and 3, I show the conduit as a corrugated pipe and also the preferred means of attaching the gate assembly thereto.

The gate seating member 1 is provided with a rearward extension 3 which conforms in contour to the inside of the last corrugation 4 of the conduit. When the conduit pipe is cinched tightly against the extension 3 and the lap of the pipe riveted together, the gate seating member will then be securely held in position without any additional fastening means.

The gate member 6 which is preferably made from sheet metal, has a slidable fit between the gate-seating member 1 and guide members 7.

The guide members 7 are attached to the gate-seating member 1 by bolts 5 and are so spaced therefrom by spacing members 8 as to bear against the front face of the gate-member 6 in such a way as to substantially engage said gate member with the face of the gate-seating member 1.

The top of the gate member is provided with a handle bar 9 which freely works through the angle cross member 10 carried by the guide-members 7. The cross member 10 is in such relation to the gate-seating member that when the gate-member 6 is brought against said cross member as in Figs. 1 and 2, said gate-member will clear the conduit opening and still bear against the top of the gate-seating member, thereby preventing said gate member from becoming disengaged from the gate-seating member 1.

The handle bar 9 also acts as a guide for the gate member, thus eliminating the customary grooves on the guide members 7 for the gate member to slide in. Thus, it will be seen that the gate member 6 is held in proper position by resting its back against the gate-seating member 1, the guide members 7 bearing against its front face; while the side motion of said gate member is limited by the spacing members 8, and the top of the gate member as already mentioned is properly held and guided by the handle bar 9.

A loose angular-faced nut 11 is threaded upon and carried solely by a set screw 12. Said set screw turns freely in a hole 13 in the cross member 10 opposite the handle bar 9 and is so placed in the angle of the cross member that one of the faces of the nut 11 bears against one web of the cross member 10 so as to prevent the nut from turning when the set screw 12 is being tightened or loosened.

It is, therefore, evident that by turning the set screw 12 it may be brought to bear against the handle bar 9 and thus locking the gate member at any desired opening.

I claim:

A water gate comprising a gate-seating member adapted to be secured to a conduit; guide members secured to said gate-seating member in position to form with its outer face a guide space; a cross member of angle section carried by said guide members; a gate member having a slidable fit in said guide space; a handle bar connected with said gate member and slidable freely through one web of the angle cross member;

a set screw playing freely through the other web of said cross member and adapted to bear upon said handle member to hold the gate member in different positions; and an angular-faced nut threaded upon and carried by the set screw, said nut lying within the angle of the cross member and held against rotation by contact of one of its faces with one of the webs of said cross member.

In testimony whereof I have signed my name to this specification.

LAURENCE WEST WYMAN.